United States Patent [19]

Harris et al.

[11] Patent Number: 4,651,879
[45] Date of Patent: Mar. 24, 1987

[54] AUTOMATIC BOTTLE SORTING SYSTEM

[75] Inventors: Mark Harris, Roxboro; Duane Copeland, Durham, both of N.C.

[73] Assignee: Clayton Durand Mfg. Co., Inc., Durham, N.C.

[21] Appl. No.: 824,658

[22] Filed: Jan. 31, 1986

[51] Int. Cl.$^4$ .............................................. B07C 5/36
[52] U.S. Cl. ................................. 209/523; 198/803.7; 209/903; 294/116
[58] Field of Search ............... 209/522, 523, 524, 903, 209/912, 919; 198/803.3, 803.7, 370, 441; 294/87.1, 116

[56] References Cited

U.S. PATENT DOCUMENTS

| | | | |
|---|---|---|---|
| 3,351,198 | 11/1967 | Wyman | 209/528 |
| 3,608,744 | 9/1971 | Ward et al. | 198/803.7 |
| 3,703,954 | 11/1972 | Gudmestad | 198/803.7 |
| 3,975,260 | 8/1976 | Peyton et al. | 209/903 |
| 4,425,996 | 1/1984 | Hoffmann | 198/803.7 |
| 4,473,147 | 9/1984 | Bouwman | 294/116 |

FOREIGN PATENT DOCUMENTS

| 49270 | 12/1968 | German Democratic Rep. | 294/116 |
|---|---|---|---|
| 403592 | 3/1974 | U.S.S.R. | 294/116 |

Primary Examiner—Robert B. Reeves
Assistant Examiner—Donald T. Hajec
Attorney, Agent, or Firm—Burns, Doane, Swecker & Mathis

[57] ABSTRACT

A bottle sorting system includes a carousel which transports bottles through various stations to classify and separate bottles according to identifying characteristics. At a transfer station, bottles are brought into alignment with gripper mechanisms that are automatically closed to engage the bottles. The bottles are then transported through an inspection staton where they are electrooptically scanned to determine their identifying characteristics. A central processing unit compares the bottle characteristics with stored sets of characteristics to classify each bottle. The locations of each classified bottle is monitored by the central processing unit as the bottles are transported by the carousel. When a particular bottle reaches a location associated with one of a plurality of discharge conveyors, the central processing unit actuates an opening device to open the gripper mechanism and release the bottle onto the conveyor. Each conveyor is associated with a different type of bottle so that the bottles are separated according to their identifying characteristics.

17 Claims, 14 Drawing Figures

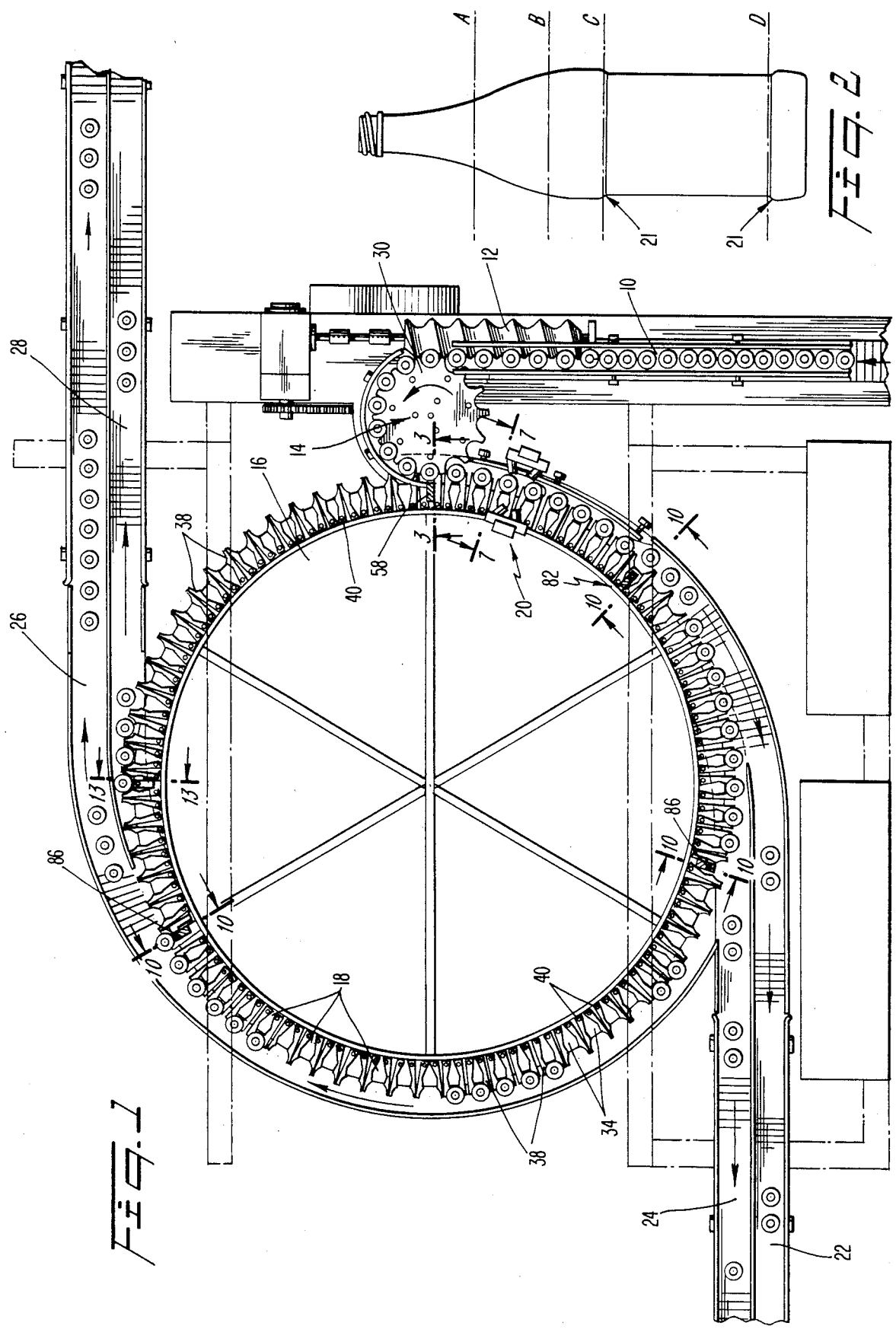

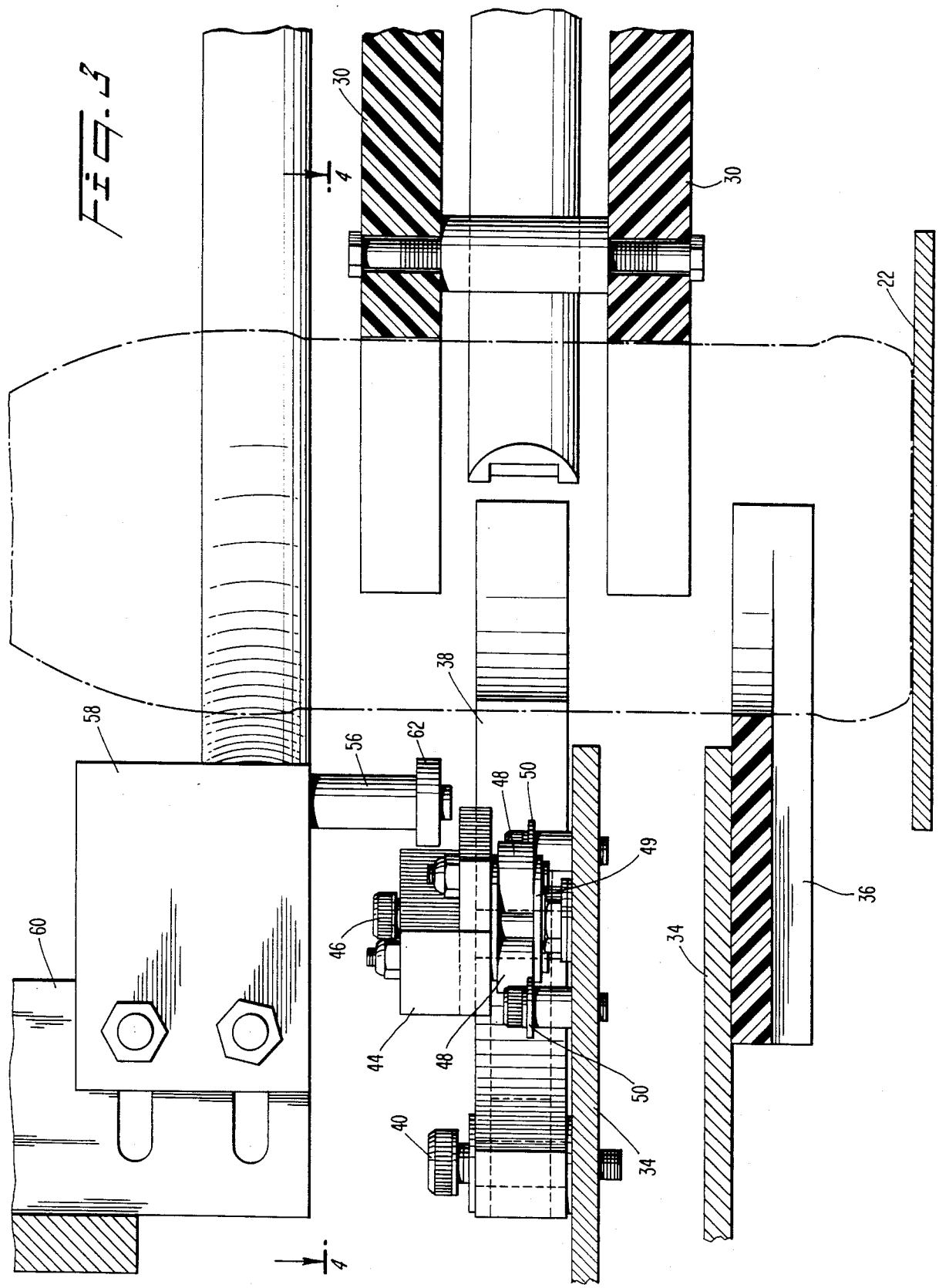

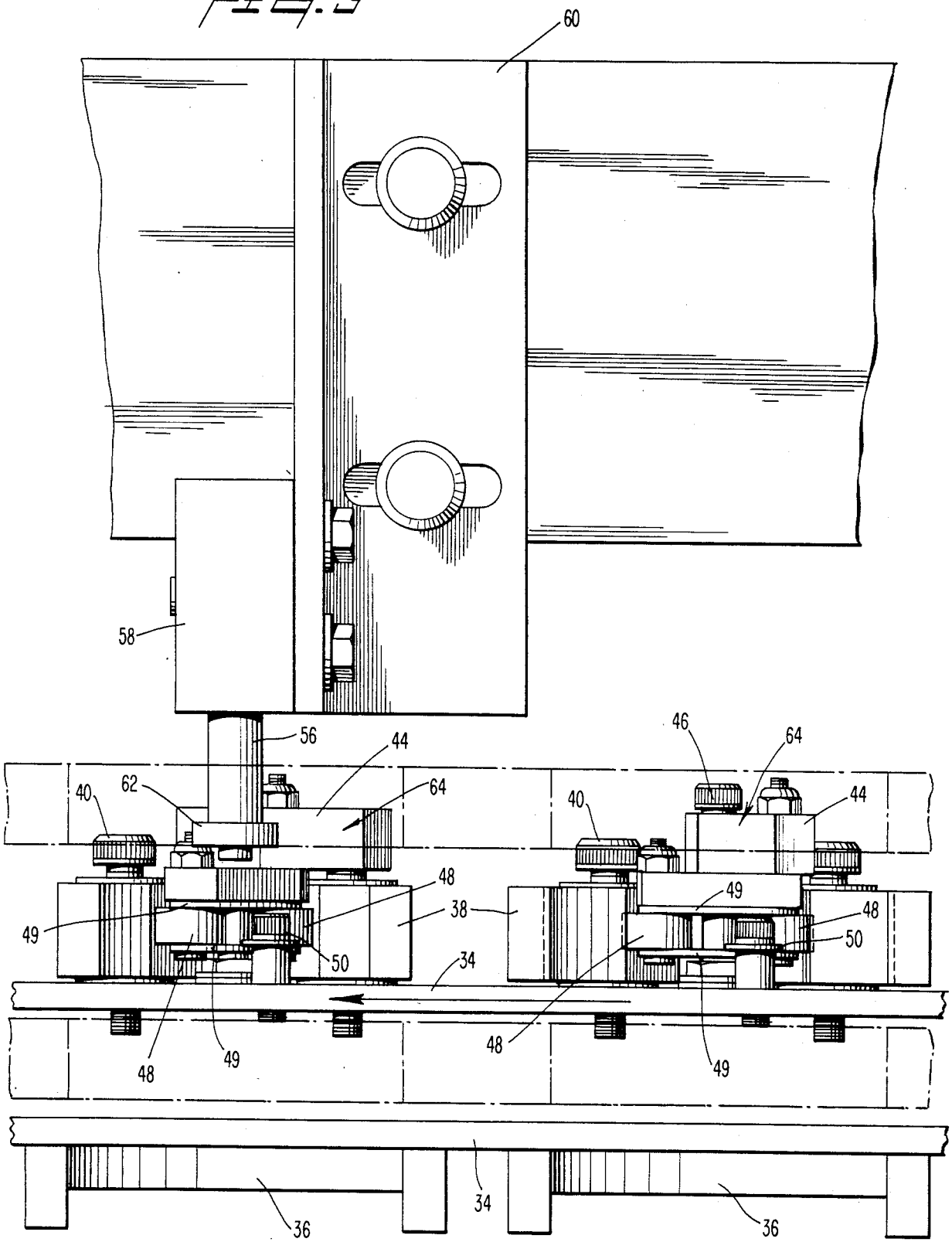

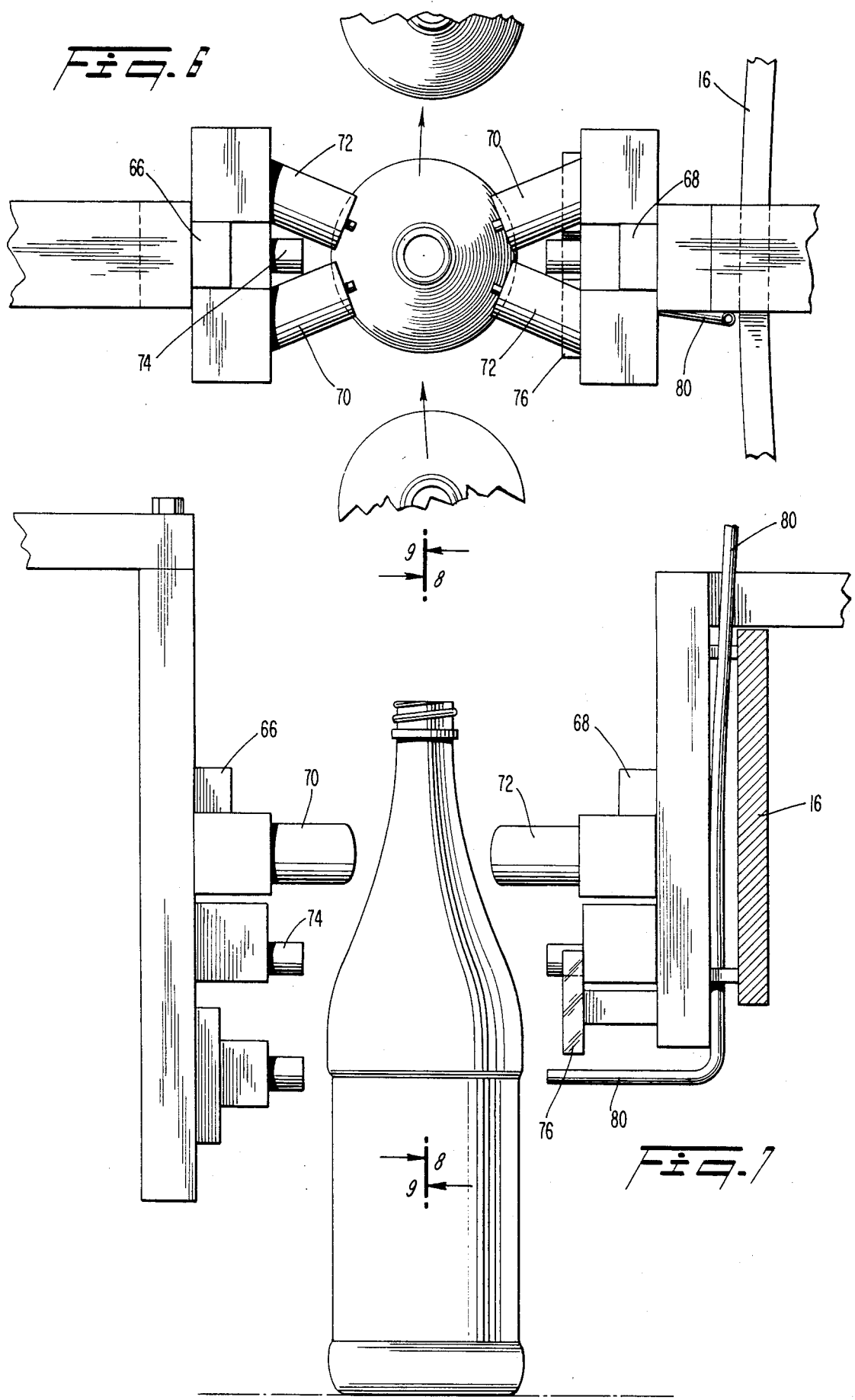

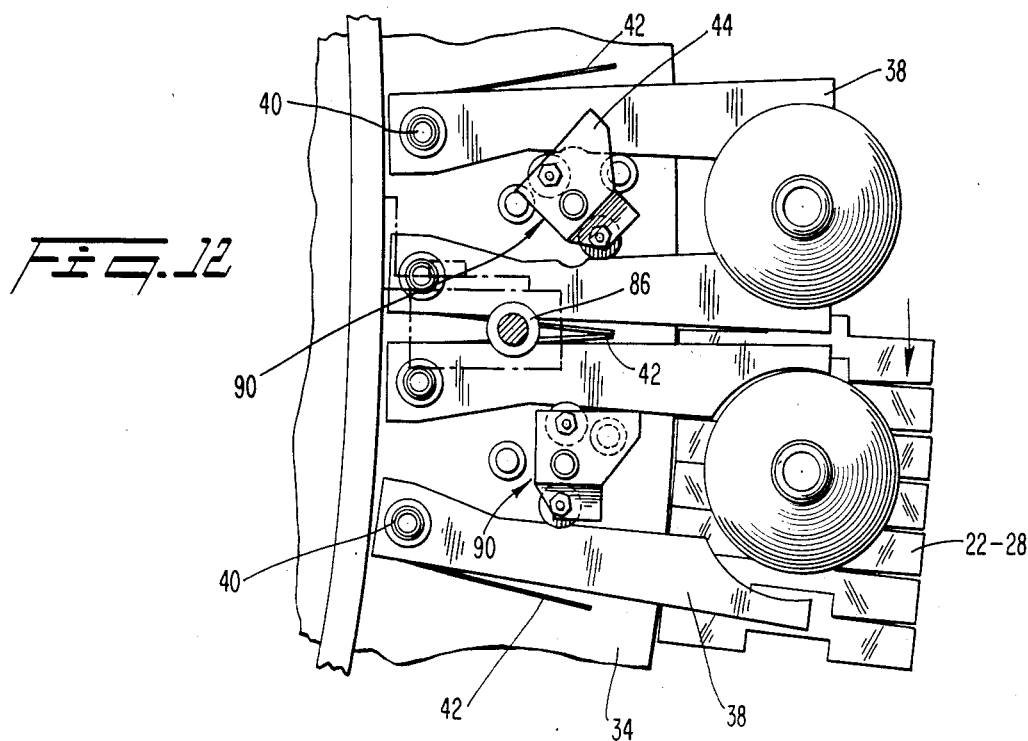
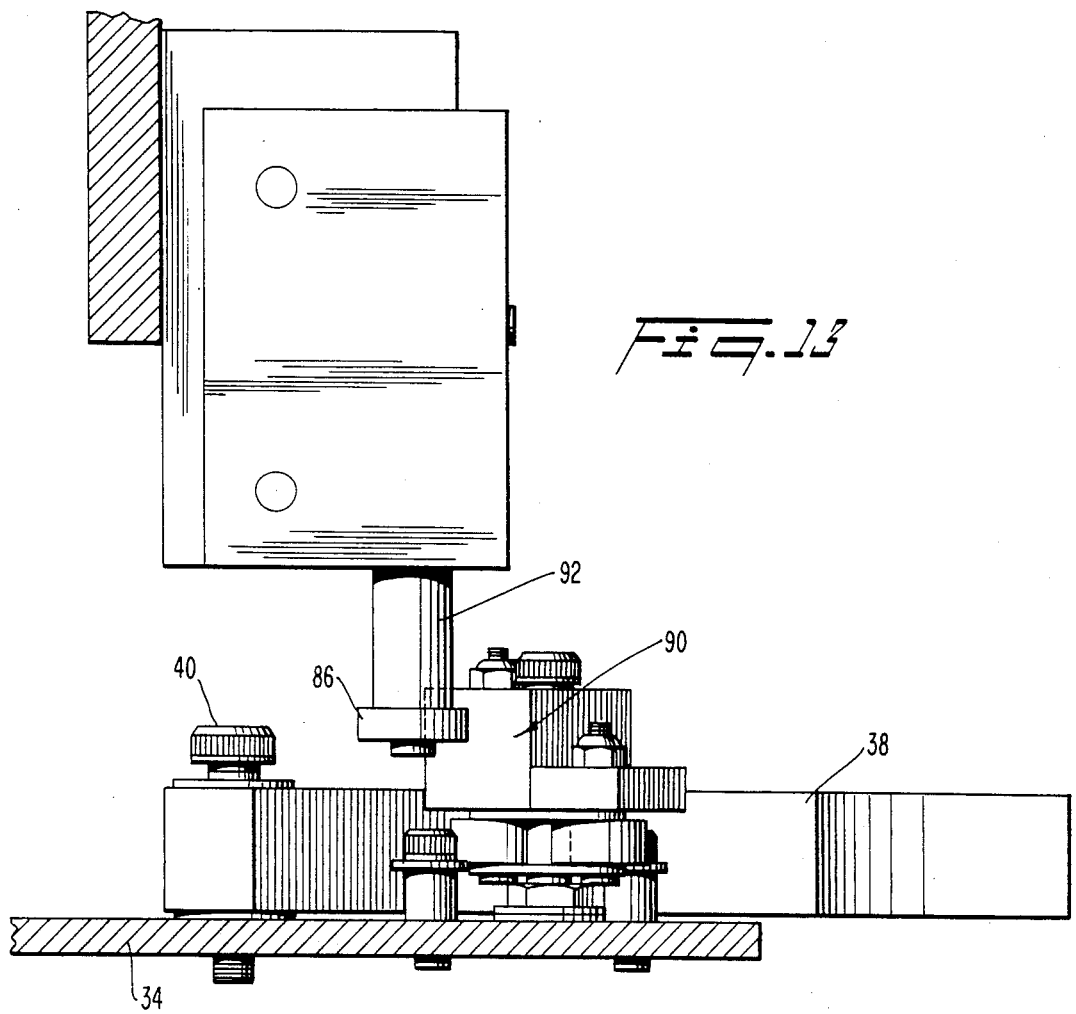

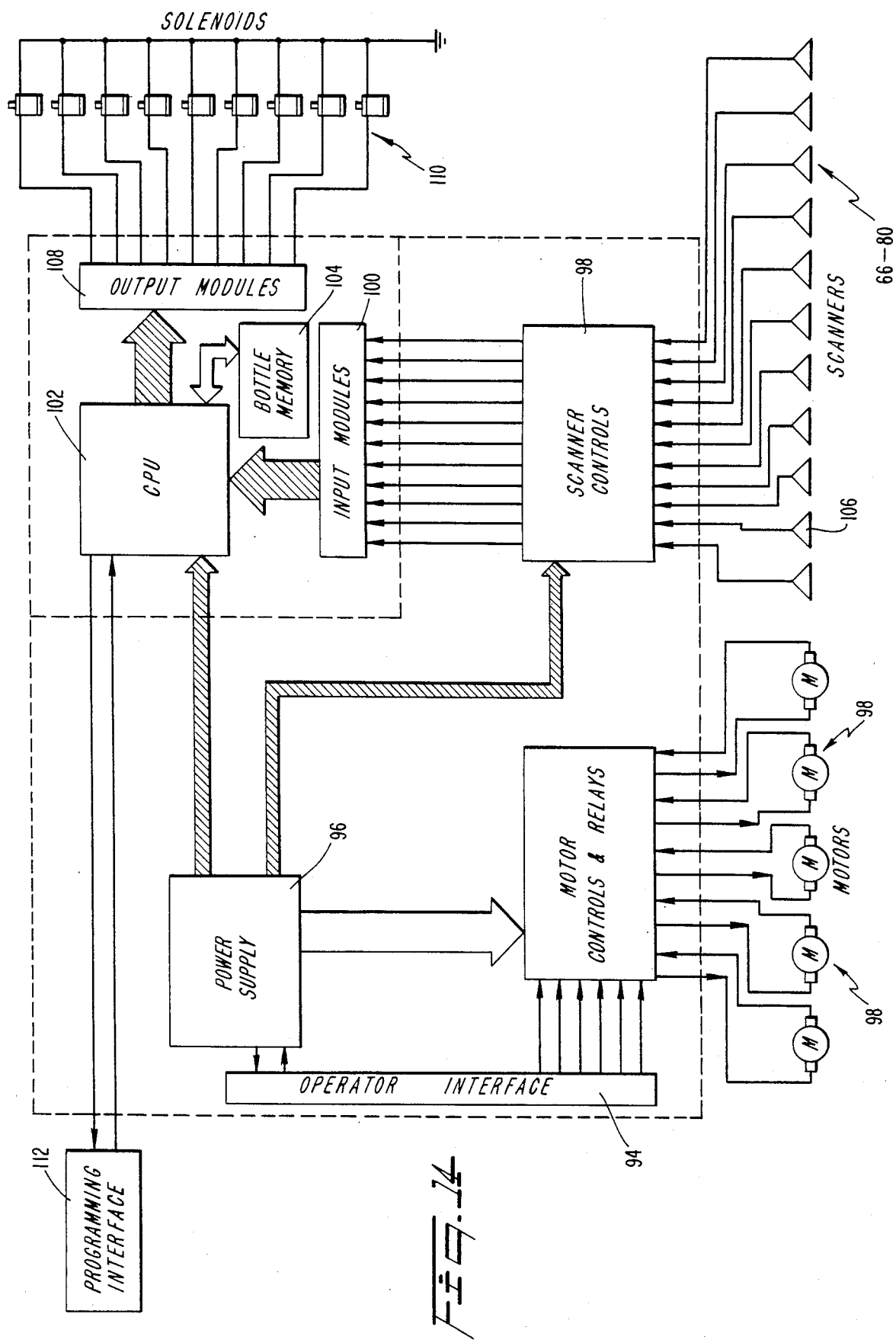

AUTOMATIC BOTTLE SORTING SYSTEM

BACKGROUND OF THE INVENTION

The present invention relates to a bottle sorting method and system wherein bottles having different color characteristics, for example indicia markings or shape, may be automatically classified and sorted into groups of similar or identical bottles.

A wide variety of products are bottled by individual manufacturers. For instance, each major soft drink company sells a variety of liquid products under different brand names in returnable bottles. When the emptied bottles are returned by consumers to an appropriate location, such as a retail store, the bottles must be sorted according to particular identifying characteristics before they can be refilled and returned to the consumer market. It can be appreciated that the enormous volume of bottles to be sorted is a major concern in the bottling industry. Sorting by hand is time consuming and costly, and therefore it is desirable to be able to automatically carry out the sorting operation.

OBJECTS OF THE INVENTION

Accordingly, it is a general object of the present invention to provide a novel system for automatically sorting bottles according to various identifying characteristics.

In this regard, it is a more specific object of the invention to provide a novel means for transporting bottles to be sorted through an inspection station where they are scanned for their identifying characteristics and then selectively released onto one of a plurality of paths according to such characteristics.

It is a particular object of the invention to provide a novel gripping arrangement for positively retaining the bottles as they are being transported and for releasing them onto the appropriate one of the paths.

It is a further object of the present invention to provide a novel bottle sorting system that is capable of distinguishing between an appreciable number of different types of bottles at speeds up to 1000 bottles per minute without any substantial delays due to falling bottles or the like.

BRIEF DESCRIPTION OF THE DRAWINGS

FIG. 1 is a general plan view of a bottle sorting system that embodies the present invention;

FIG. 2 is a side view of a bottle illustrating possible locations on a bottle that can be scanned to determine its identifying characteristics;

FIG. 3 is a detailed side view, taken along the line 3—3 of FIG. 1, illustrating the bottle as it is transferred from the star wheel to the carousel conveyor;

FIG. 5 is an end view of two pairs of grippers at the transfer station, taken along the line 5—5 of FIG. 4;

FIG. 6 is a detailed top view of the bottle inspection station;

FIG. 7 is a side view of the inspection station, taken along the line 7—7 of FIG. 1;

FIG. 12 is a top view of gripper mechanisms at a release station, taken along the line 12—12 of FIG. 10;

FIG. 13 is a side view of the final release station, taken along the line 13—13 of FIG. 1; and FIG. 14 is a block diagram of the control system for the bottle sorter.

DESCRIPTION OF THE ILLUSTRATED EMBODIMENT

Figure 4:
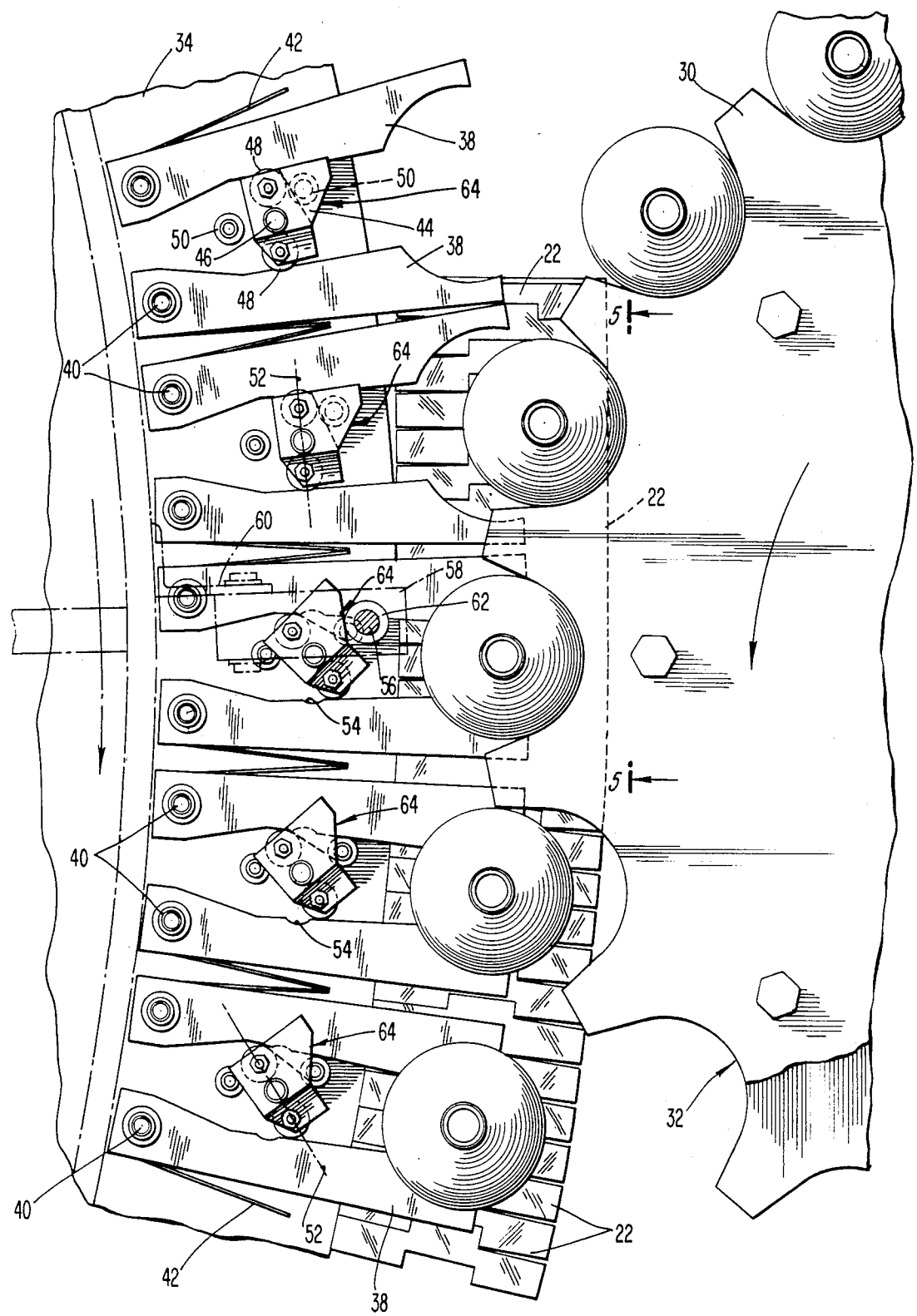
FIG. 4 is a detailed top view of the transfer operation depicted in FIG. 3.
Figure 8:
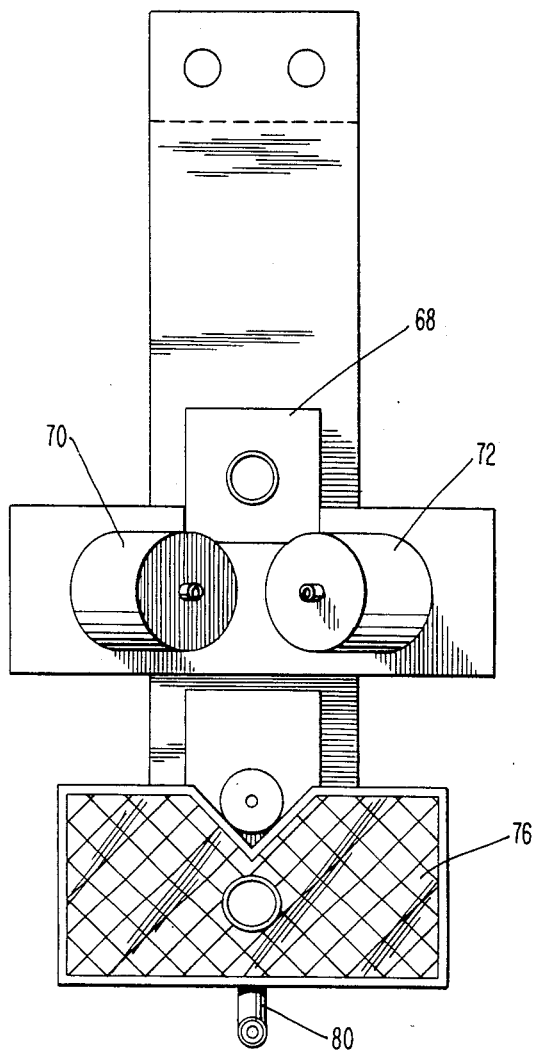
FIG. 8 is an end view of one side of the inspection station, taken along the line 8—8 of FIG. 7.
Figure 9:
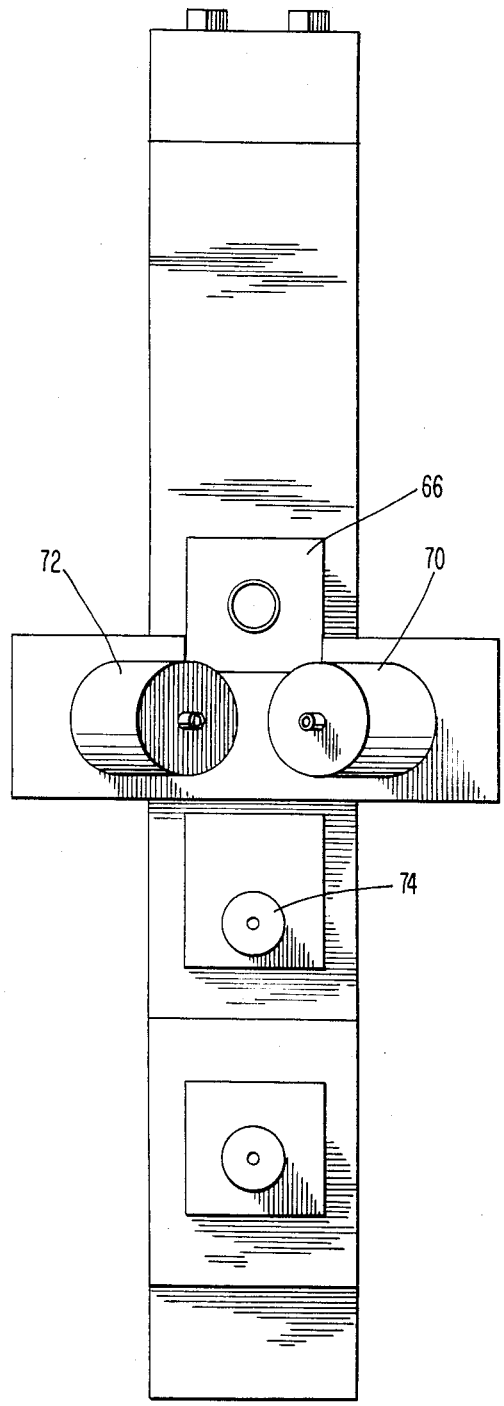
FIG. 9 is an end view of the other side of the inspection station, taken along the line 9—9 of FIG. 7.

Referring to the overall plan view of FIG. 1, the basic components and general operation of a bottle sorting system embodying the present invention are illustrated. The system includes an input chute 10 along which bottles to be sorted are conveyed. As they travel along the chute, the bottles encounter a separator screw mechanism 12 that provides a predetermined spacing between adjacent bottles. At the end of the separator 12, the bottles are engaged by a star wheel 14 which rotates in unison with the separator to transfer the bottles from the input chute 10 to a carousel 16.

The carousel 16 includes a number of gripper mechanisms 18 which retain the bottles and transport them around a circular path. As the bottles are being transported around this path, they pass through an inspection station 20. Here, they are individually scanned by various electrooptical scanning devices that operate in any one or more of the incandescent, infra-red and ultraviolet regions of the light spectrum. These scanners detect the effect which the bottles have on different beams of light, to characterize the bottles according to various identifying criteria of interest, such as color, size, shape, topographic peculiarities, material composition or the location of particular superficial indicia.

As an example, FIG. 2 illustrates one possible arrangement for scanning a bottle to identify it as belonging to a particular class of bottles. The bottle is traversed by four horizontal light beams A, B, C and D. The uppermost light beam A might simply determine whether the bottle has a particular height. The next light beam B might detect whether there is indicia or embossing at the base of the neck for the bottle. The two lower light beams C and D can be used to detect whether knurls 21 are present on the bottle at specified heights. By sensing the manner in which a bottle affects each of these light beams as it passes through the inspection station, a determination can be made whether the bottle belongs in a particular category of bottles.

While only one inspection station 20 is depicted in the illustrated embodiment, it will be appreciated that two or more such stations could be employed as appropriate to detect all of the various identifying criteria of interest.

After passing through the inspection station, each bottle is identified as belonging to one of a number of categories. For purposes of illustration, the presently disclosed embodiment is described with reference to the classification of bottles into one of four different categories. Each category is associated with a different discharge conveyor onto which the bottles are selectively deposited after being classified. Thus, in the disclosed embodiment there are four such discharge conveyors 22, 24, 26 and 28. Each of the discharge conveyors intersects the carousel 16 at a different point along the path of travel of the bottles, and has a linear portion that is generally oriented along a tangent to the perimeter of the carousel.

It has been found that a bottle sorting system constructed in accordance with the present invention is capable of sorting a much larger number of different types of bottles. For example, a system having a carousel that is seven feet in diameter can easily separate up to twelve different types of bottles.

In operation, after the bottles have been classified in the inspection station, the gripper mechanisms are selectively actuated to release each bottle onto the proper one of the discharge conveyors 22–28. The bottles are thereby sorted according to their identifying criteria and separately conveyed to further locations where they are prepared for refilling with the appropriate contents or further processing.

Referring now to FIGS. 3, 4 and 5, the transfer of the bottles from the star wheel mechanism to the carousel is illustrated in greater detail. The star wheel mechanism comprises a pair of spaced, generally circular plates 30 having arcuate cutouts 32 on their peripheries to accommodate individual bottles. Through synchronized rotation of the plates 30 and the carousel 16, each bottle is brought into alignment with one of the gripper mechanisms 18. At the same time the bottle comes to rest on an initial arcuate portion of the first discharge conveyor 22 (see FIG. 3).

The carousel 16 comprises a pair of spaced rings 34. The gripper mechanisms 18 are mounted on the upper ring, and the lower ring has corresponding bottle guides 36 mounted on it. These bottle guides are respectively aligned with the gripper mechanisms 18 and provide stability to the bottles as they are being delivered to and retained by the gripper mechanisms.

Each gripper mechanism includes a pair of generally parallel arms 38 that are mounted at one end onto the upper carousel ring 34 for pivotal movement about stainless steel posts 40. At the other end, the interior sides of the arms, i.e. the sides of the two arms that face each other, are arcuately shaped to accommodate the bottles. Each arm has a stainless steel leaf spring 42 attached to its exterior side near the end that is pivotally mounted. The leaf spring 42 of each arm engages a similar exterior leaf spring on one arm of the adjacent gripper mechanism. With this arrangement of engaging leaf springs, the pair of arms in each gripper mechanism are biased toward one another.

Located within the interior of each pair of arms in a gripper mechanism is a cam block 44 mounted for pivotal movement about a stainless steel shaft 46. A pair of rollers 48 are mounted at opposite ends of links 49 on the underside of each cam block, and respectively engage the interior sides of the two arms 38. The cam block 44 is pivotable between two positions. These two positions are respectively defined by a pair of stops 50 that are mounted on the upper carousel ring 34 and that abut one of the rollers. In one of the positions, illustrated with respect to the three lower (or downstream) gripper mechanisms depicted in FIG. 4, the line of intersection 52 of the two rollers is at an acute angle relative to the longitudinal direction of the arms. In this position, the rollers exert little if any force on the arms, so that the leaf springs bias them towards one another to close the gripper mechanism, and thereby retain a bottle.

In the other position, illustrated with regard to the two upper gripper mechanisms shown in FIG. 4, the line of intersection 52 of the rollers is approximately transverse to the longitudinal direction of the arms. In this position the rollers force the arms apart against the bias of the springs, so that the gripper mechanism is open. The interior surfaces of the arms 38 are provided with detents 54 to positively engage the rollers in this position.

The pivotal movement of the cam block 44 between its two positions, and hence the opening and closing of the gripper mechanisms, is controlled by appropriately positioned plunger rods. In operation, each gripper mechanism is closed as it is brought into alignment with one of the cutouts 32 on the star wheel mechanism to thereby retain a bottle located in that cutout. Accordingly, one plunger rod 56 is positioned at the location where the bottles are transferred from the star wheel mechanism to the carousel. Referring to FIGS. 3 and 5 in particular, the plunger rod 56 depends from a mounting block 58 that is supported in a stationary position by a bracket 60. The lower end of the rod 56 has a flange 62 that is positioned to engage a cam surface 64 on the cam block 44.

In the operation of the bottle sorting system, when each gripper mechanism enters the transfer station its cam block 44 is in the position where the rollers 48 are engaged in the detents 54 to hold the arms open. This configuration is depicted with regard to the right-hand gripper mechanism shown in FIG. 5. As the gripper mechanism passes through the transfer station, the cam surface 64 is engaged by the stationary plunger rod 56 to rotate the cam block counterclockwise as viewed in FIG. 4. Accordingly, the arms of the gripper mechanism are closed to retain a bottle that is presented by the star wheel mechanism 14. Although the bottle is resting on the first discharge conveyor 22 at this point, the movement of the bottle is controlled by the carousel through the gripper mechanism, rather than the conveyor.

To decrease the incidence of wear on the plunger rod 56 and thereby increase its life expectancy, it is mounted on bearings (not shown) within the mounting block 58 so that it can freely rotate about its longitudinal axis. Preferably, two sets of bearings are spaced along the length of the rod to provide greater stability. In addition, the rod is preferably made of stainless steel.

To provide positive gripping action, the arms 38 are preferably made of a nylon thermoplastic material. One preferred material of this type is an acetal resin sold under the trademark Delrin.

The inspection station 20 located downstream of the transfer station is illustrated in greater detail in FIGS. 6–9. At this station, any of a number of different types of sensing devices can be employed to detect various characteristics of a bottle. For example, one type of sensor might use through-beam scanning in which the bottle passes between a light emitter 66, e.g. an LED, and a photodetector 68. Such a sensor can be used to determine the presence of a bottle as well as whether it has a particular shape or size, e.g. a certain height.

Another type of sensor might be one in which the detector 70 is oriented at a predetermined angle relative to the light source 72. This detector will receive only light that reflects off the bottle at a predictable angle. This type of sensor can be used to detect particular surface anomalies on the bottle that can serve as identifying indicia. Preferably, two such sensors are located on opposite sides of the bottle to scan its entire surface.

In another version of a reflective scanner, an infrared detector is located at the same position as the light source and can sense the color of the bottle by determining the amount of illumination that it absorbs.

An ultraviolet scanner which induces fluorescent light emissions can be used to detect the type of material that the bottle is made from.

Other types of sensors, such as those referred to in U.S. Pat. Nos. 2,609,926, 3,259,240 and 3,351,198 can also be employed to classify bottles according to different types.

If the photodetector or light source is particularly susceptible to vibration or contamination from passing bottles, it need not be physically located at the inspection station. Rather, fiber optic waveguides 80 can be used to conduct light to or from a remote location that provides a more suitable environment.

After a bottle has been classified at the inspection station it continues around the circular path until it is released onto one of the discharge conveyors 22-28 at various release stations. These release stations are respectively situated at the positions where the discharge conveyors intersect the circular path of the carousel. For example with reference to FIG. 1, the first release station 82 is located at a point where the first conveyor 22 begins to diverge from the circular path.

In fact, the precise location of the release station is critical to the successful operation of the sorting system at high speeds. For best results, the bottle should be released from the gripper at the point where the direction of motion of the discharge conveyor is tangential to the circular path defined by the carousel. By releasing the bottle at this point, its momentum causes it to follow the tangential path of the conveyor. Accordingly, the bottle can be taken away by the conveyor without having to undergo any change in its natural direction of travel. However, if the bottle is released prior to or subsequent to the tangential point, it will be appreciated that the conveyor will cause it to move in a direction other than where its momentum wants to take it. In such a case, the bottle is much more likely to tip over, resulting in significant and costly delays.

The second conveyor 24 begins at about the location of the first release station. It has an initial arcuate portion which follows the circular path for a short distance and then diverges to a linear path parallel to the first conveyor 22. If a bottle is not released onto the first conveyor, it is carried over onto the second conveyor by the gripper mechanism. For this reason the various discharge conveyors are preferably coplanar. The bottle might be released onto the second conveyor 24 if it has been classified as a particular type, or it can be retained and carried to one of the further downstream conveyors.

Figure 10:
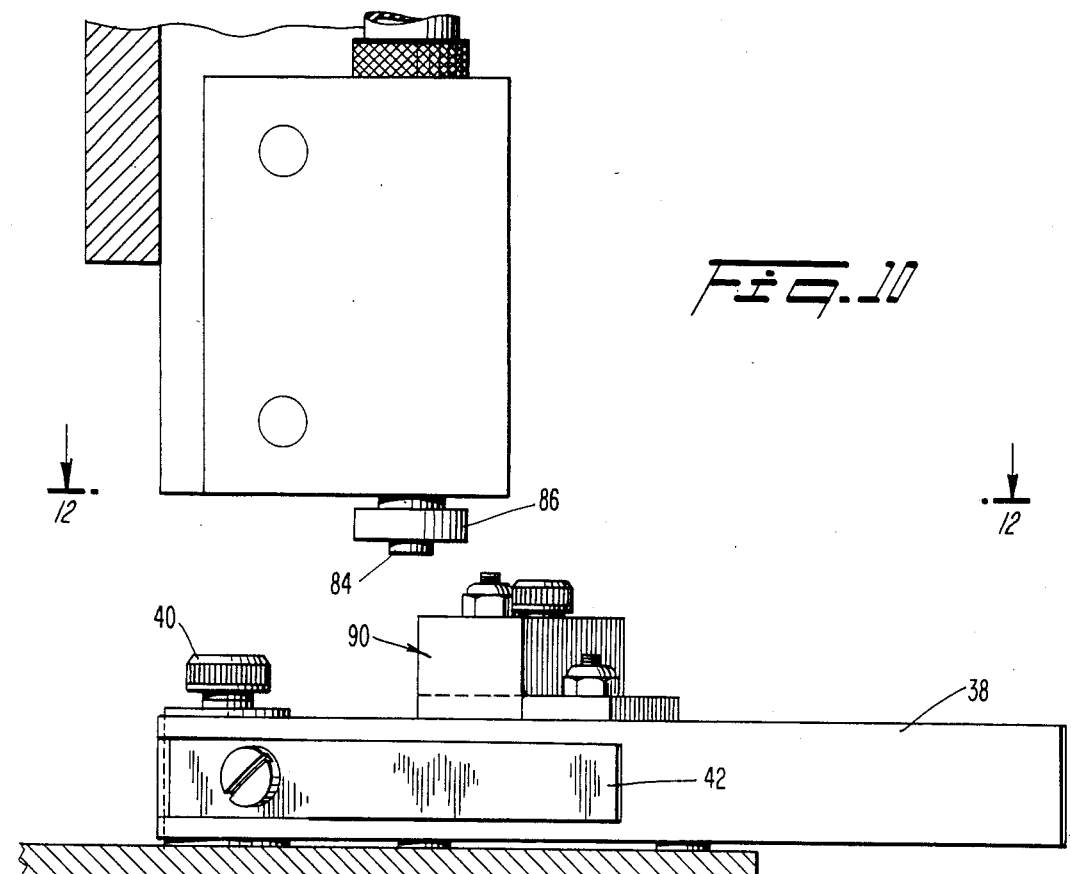
FIG. 10 is a side view of a gripper mechanism at one of the release stations, illustrating the grippers in a closed position to retain a bottle.
Figure 11:
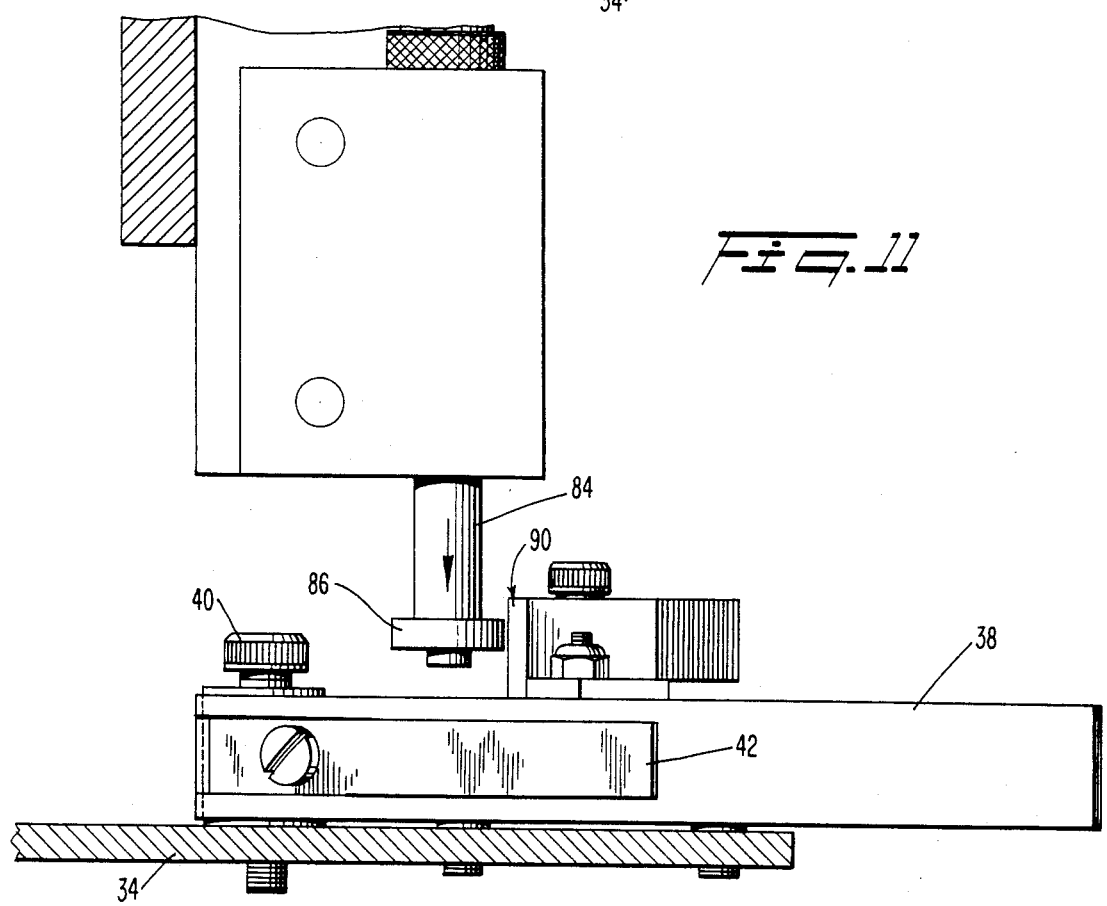
FIG. 11 is a side view of a gripper mechanism at one of the release stations, illustrating the opening of the grippers to release a bottle onto a discharge conveyor.

Each release station includes a device to selectively open the arms of a gripper mechanism. Referring to FIGS. 10-12, this opening device comprises a reciprocable plunger rod 84. Like the plunger rod 56, this rod has a camming flange 86. When the rod is in its retracted position illustrated in FIG. 10, it lies out of the path of movement of the cam block. Therefore, the gripper mechanism can pass through the release station unaffected and carry the bottle to further downstream stations.

However, if the bottle in a particular gripper mechanism has been identified as being of the type associated with the release station of interest, the plunger rod 84 at that station is extended as shown in FIG. 11. In the extended position, the camming flange 86 engages a second cam surface 90 on the cam block 44 (see FIG. 12). When this engagement occurs, the cam block 44 is pivoted in the clockwise direction to open the gripper mechanism, as shown with respect to the downstream gripper in FIG. 12. Accordingly, the bottle is then free to be conveyed by the associated discharge conveyor 22-28 rather than continue to follow the circular path of the carousel.

The reciprocation of the rod 84 can be carried out by any suitable means. For example, the rod itself might comprise the plunger of a solenoid. Alternatively, it can be the piston of a hydraulic or pneumatic cylinder that is actuated through a solenoid-controlled three-way valve. In any case, it is preferable that the plunger rod be mounted on bearings so that it is free to rotate about its longitudinal axis, similar to the plunger rod 56.

The final discharge conveyor 28 is preferably designed to receive all bottles that have not been previously released onto one of the upstream conveyors. If all remaining bottles are not released at the last station they could interfere with subsequent operations at the transfer station. Accordingly, the plunger rod 92 at the final release station, depicted in FIG. 13, is not reciprocated. Rather, it remains extended at all times, to engage the camming surface 90 of all gripper mechanisms that have not been previously opened. This arrangement serves the dual purpose of releasing all remaining bottles onto the final discharge conveyor 28 as well as ensuring that all of the gripper mechanisms are opened before they enter the transfer station.

The control system for processing the information relating to each bottle and actuating the release plunger rods 84 to properly sort the bottles is illustrated in FIG. 14. An operator interface panel 94 provides the system operator with a main on/off switch that controls the power supply 96 for the system components. In addition, the operator can control the actuation and individual speeds of the motors 98 that drive the separator 12, the star wheel 14, the carousel 16 and the discharge conveyors 22-28. Preferably, the separator, star wheel and carousel are driven by one motor through suitable transmission mechanisms so that they are all maintained in synchronism. In particular, the motor is connected to each of these components through a direct drive, so that they do not get out of phase over time due to wear or stretching of drive chains or the like. Each of the discharge conveyors can be driven by a separate motor, so that they can be selectively actuated and have their speeds individually controlled as appropriate. For example, it may be desirable to have the discharge conveyors 22-28 operate at a speed which is slightly greater than the peripheral speed of the carousel, so that once a bottle is released onto a conveyor it is quickly transported away and does not interfere with the release of subsequent bottles.

The scanners 66-80 at the inspection station are controlled by and provide input signals to a scanner control circuit 98. For example, the scanner control circuit can regulate the intensity and frequency of the light emitters for each of the scanners. It is not necessary to maintain all of the scanners on when bottles are not present. Accordingly, the control circuit normally de-energizes all of the sensors except one. Referring to FIG. 7, the one sensor 74 that remains on can emit an infrared beam that traverses the path of the bottle. A reflector 76 located on the opposite side of the path reflects the beam back to the sensor when no bottle is present. As soon as a bottle crosses the beam, the beam is sufficiently scattered to cause the sensor to emit a signal that is detected by the control circuit 98. In response to this signal, the control circuit energizes all of the other sensors to identify the bottle.

The output signals produced by the various scanners are presented as data signals to input modules 100. The input modules can be programmable to respond only to certain data signals or combinations of data signals. For example, a particular input module might detect whether the amplitude of a data signal from a particular scanner crosses a programmable threshold level. In response to the detected amplitude, the input module provides a binary signal to a central processing unit 102.

The central processing unit 102 processes the signals from all of the input modules and classifies the bottle passing through the inspection station. In particular, the combination of signals from the input modules comprises an identifying signature of the bottle. This signature is compared with various signatures that are stored in a memory unit 104 and associated with the respective discharge conveyors 22-28. As a result of the comparison, the bottle type is identified and this information is stored in the memory unit 104. For example, the identity of the bottle might be stored in terms of the particular release station associated with that type of bottle.

To keep track of all of the identified bottles, a dedicated scanner 106 detects each gripper mechanism as it passes a predetermined point. This point could be the inspection station or it could be any other point along the circular path of travel of the carousel. As each gripper mechanism passes this point, a signal is sent to the CPU. In response to this signal, the CPU updates the location of each identified bottle in the memory.

The CPU compares the stored location of each identified bottle with the locations of the release stations. When a bottle reaches the location of the particular station at which it is to be released, the CPU provides an output signal to output modules 108. In response to this signal, the output modules selectively actuate one of various solenoids 110 to extend the appropriate plunger rod 84 at the proper release station. Accordingly, the gripper mechanism passing through that station is opened to release the bottle onto the discharge conveyor.

To adapt the system to various different types of bottles, a programming interface 112 can be provided. This interface enables the signatures stored in the memory 104 to be revised and allows the number of active discharge conveyors to be changed.

It will be appreciated by those of ordinary skill in the art that the present invention can be embodied in other specific forms without departing from the spirit or essential characteristics thereof. The presently disclosed embodiment is therefore considered in all respects to be illustrative and not restrictive. The scope of the invention is indicated by the appended claims rather than the foregoing description, and all changes that come within the meaning and range of equivalents thereof are intended to be embraced therein.

What is claimed is:

1. A gripper mechanism for use in an automatic bottle sorting machine, comprising:
    a plurality of gripper members arranged adjacent one another, each gripper member including
    first and second gripper arms, each gripper arm having attachment means at one end providing pivotal movement thereof and having an arcuate cut-out adjacent the opposite end for engagement with a bottle;
    a camming means movable between a first position for urging said arms apart to an open position to release a bottle and a second position for allowing said arms to close in a bottle gripping position;
    each gripper arm having a leaf spring on a side opposite said arcuate cut-out, each said leaf spring engaging a leaf spring on an adjacent gripper member and urging said gripper arms to said bottle gripping position.

2. A gripper mechanism as set forth in claim 1, wherein said camming means is a cam block having a first surface for engagement with a closing means mounted on a stationary support means for moving said camming means from said first position to said second position and a second surface for engagement with an opening means mounted on said support means for moving said camming means from said second position to said first position.

3. A gripper mechanism as set forth in claim 2, wherein a roller mechanism is attached to said cam block, said roller mechanism including two rollers respectively engaging said first and second gripper arms.

4. A gripper mechanism as set forth in claim 3, wherein each of said gripper arms includes a detent on a side opposite said leaf spring, said rollers being in engagement with said detents in said open position.

5. A gripper mechanism as set forth in claim 1, wherein said gripper arms are formed of an acetal resin.

6. An automatic bottle sorting apparatus comprising:
    a carousel providing a circular path of movement;
    means for feeding bottles to said carousel at a predetermined location on said carousel;
    a plurality of gripper mechanisms on the perimeter of said carousel arranged adjacent one another, each gripper mechanism including:
    first and second gripper arms, each gripper arm having pivotal attachment means at one end and an arcuate cut-out adjacent the opposite end for engagement with a bottle;
    a camming means movable between a first position for urging said arms apart to an open position to release a bottle and a second position for allowing said arms to close in a bottle gripping position;
    each gripper arm having a leaf spring on a side opposite said arcuate cut-out, each said leaf spring, engaging a leaf spring on an adjacent gripper mechanism and urging said gripper arms to said bottle gripping position.

7. An automatic bottle sorting apparatus as set forth in claim 6, wherein said camming means is a cam block having a first surface for engagement with a closing means mounted on a stationary support means for moving said camming means from said first position to said second position and a second surface for engagement with an opening means mounted on said support means for moving said camming means from said second position to said first position.

8. An automatic bottle sorting apparatus as set forth in claim 7, wherein a roller mechanism is attached to said cam block, said roller mechanism including two rollers respectively engaging said first and second gripper arms.

9. An automatic bottle sorting apparatus as set forth in claim 8, wherein each of said gripper arms includes a detent on a side opposite said leaf spring, said rollers being in engagement with said detents in said open position.

10. An automatic bottle sorting apparatus as set forth in claim 9, wherein said gripper arms are formed of an acetal resin.

11. An automatic bottle sorting apparatus as set forth in claim 7, wherein said closing means is mounted on said carousel adjacent said predetermined location.

12. An automatic bottle sorting apparatus as set forth in claim 11 wherein said closing means includes a rod mounted for rotation about its longitudinal axis.

13. An automatic bottle sorting apparatus as set forth in claim 7, and further including a plurality of conveying mechanisms at spaced locations around said carousel, each conveying mechanism having a portion located adjacent to said circular path and being adapted to carry sorted bottles away from said carousel.

14. An automatic bottle sorting apparatus as set forth in claim 13, wherein a plurality of said opening means are mounted at spaced locations around said carousel, each opening means being respectively mounted adjacent said carousel at the location of said portions of said conveying mechanisms.

15. An automatic bottle sorting apparatus as set forth in claim 14, wherein each of said opening means includes a reciprocating piston adapted to move into engagement with said second surface of said camming means to cause one of said gripper mechanisms to open.

16. An automatic bottle sorting apparatus as set forth in claim 14, and further including a plurality of detector means located adjacent said circular path for detecting characteristics of a bottle and providing an output signal identifying said characteristics.

17. An automatic bottle sorting apparatus as set forth in claim 16, and further including a central processing unit having a memory means for storing predetermined characteristics, means for comparing the output signals from said detecting means with the stored characteristics and means responsive to said comparing means for actuating one of said pistons to engage said camming means and open one of said gripper mechanisms to release a bottle to be transported on one of the conveying mechanisms.

* * * * *